United States Patent
Cooper et al.

(10) Patent No.: US 7,438,319 B2
(45) Date of Patent: Oct. 21, 2008

(54) MODULAR ROLL PROTECTION STRUCTURE (ROPS) FOR COMPACT TRACTORS

(76) Inventors: Bruce Russell Lee Cooper, 23 Wright Street, Clifton Hill, 3068, Victoria (AU); Frank Allen, 3 Bowen Street, Hawthorn, 3122, Victoria (AU)

(*) Notice: Subject to any disclaimer, the term of this patent is extended or adjusted under 35 U.S.C. 154(b) by 0 days.

(21) Appl. No.: 11/672,595

(22) Filed: Feb. 8, 2007

(65) Prior Publication Data
US 2007/0182147 A1    Aug. 9, 2007

(30) Foreign Application Priority Data
Feb. 9, 2006    (AU) ............... 2006900649

(51) Int. Cl.
*B60R 21/13* (2006.01)
(52) U.S. Cl. .................. 280/756; 296/102
(58) Field of Classification Search ........... 280/756; 296/102
See application file for complete search history.

(56) References Cited

U.S. PATENT DOCUMENTS

| | | | | |
|---|---|---|---|---|
| 3,791,668 A | * | 2/1974 | Adams | 280/756 |
| 4,032,187 A | * | 6/1977 | Atherton | 296/102 |
| 4,049,294 A | * | 9/1977 | Atherton | 280/756 |
| 4,158,460 A | | 6/1979 | White | |
| 4,159,835 A | * | 7/1979 | Leja et al. | 280/756 |
| 5,042,835 A | * | 8/1991 | Burns | 280/756 |
| 5,086,858 A | * | 2/1992 | Mizuta et al. | 180/68.3 |
| 5,129,676 A | * | 7/1992 | Sheehan | 280/756 |
| 5,503,430 A | * | 4/1996 | Miki et al. | 280/756 |
| 5,779,272 A | * | 7/1998 | Panek et al. | 280/756 |
| 5,839,758 A | * | 11/1998 | Finch et al. | 280/756 |
| 5,971,434 A | * | 10/1999 | Neufeld et al. | 280/756 |
| 6,237,952 B1 | * | 5/2001 | Burckhartzmeyer et al. | 280/756 |

* cited by examiner

*Primary Examiner*—Toan C To
(74) *Attorney, Agent, or Firm*—Smith-Hill and Bedell

(57) ABSTRACT

A roll over protection device for compact tractors has a tubular steel hoop 14 carried by a channel section coupling 20 and the coupling is bolted to a bracket 12 with holes 34 and slots 36 which enable it to be bolted to the transmission housing of the tractor. The hoop 14 and coupling 20 are the same whatever the make of tractor, but the bracket is intended to fit different models.

12 Claims, 4 Drawing Sheets

MODULAR ROLL PROTECTION STRUCTURE (ROPS) FOR COMPACT TRACTORS

FIELD OF THE INVENTION

This invention concerns roll over protection devices (ROPS) for tractors of smaller scale.

BACKGROUND OF THE INVENTION

ROPS have been used to protect tractor drivers from crushing injuries caused during tractor roll over accidents. A common type of ROPS used consists of an inverted U-shaped bar having two uprights joined at their upper ends by a crossmember and fixed to a pair of brackets at their lower ends. The brackets are either attached to existing holes in the rear axle or with the use of clamp plates and bolts, are clamped around the rear axle housing. Bolts are then passed through the apertures and into the existing holes or passed through the lower clamp plate so as to fasten the brackets to the rear axle housing of the tractor and thereby mount the ROPS onto the tractor for use.

This type of ROPS arrangement suffers in that it may only fit tractors of a specific model, whereas tractors come in a large range of models. Thus it may be difficult and expensive for tractor owners to find and ascertain ROPS which correctly fit their tractors, and for ROPS manufacturers to produce a large variety of sizes and models of ROPS required to accommodate the differing nature of the tractors.

The large range of ROPS required, along with the size and shape of this type of ROPS, can also be problematic during transportation thereby leading to increased freighting costs. Furthermore, the process of drilling holes in the rear axle can be inefficient and improperly performed.

Thus there is a need for a ROPS which can be mounted on to a variety of tractors of differing models and sizes. There is also a need for a ROPS which can be efficiently freighted.

Drivers of standard size tractors are able to fit a ROPS for a large range of tractors. This market is well developed and many models can be purchased with original equipment or retrofitted equipment. Australian and international standards exist for such bars.

Operators of hobby farms and market gardens prefer small scale tractors with a mass 400-2000 kg. These have a differential housing at the rear wheels and the housing incorporates the three point lift linkage for supporting implements.

Additionally the housing has threaded bores for the reception of attachment bolts to permit the use of specialised equipment. Several brands of compact tractors are popular and each brand includes a variety of models. The existence of prevailing standards means that if an owner wishes to comply ROPS with the law, each model must have an individually designed ROPS.

The ROPS comprises a hoop and a fabricated bracket which connects the hoop to the tractor such that upon roll over the hoop ensures that there is clearance between the tractor and the ground thereby reducing the risk of crushing injury. The ROPS must be carefully designed and tested to ensure adequate energy absorption is achieved, without excessive deflection, in compliance with the relevant standards. The bores in the bracket must register with the threaded bores in the housing and the parts of the bracket must not impede the movement of the links of the three point linkage.

The cost of safety equipment is unwelcome to operators. The costs incurred by manufacturers in the design of the variety of individual components and the costs to dealers who would have to stock the variety of components would generate prices which would be a barrier to the adoption of the roll protection bars on small tractors.

Operators do not want components which are heavy to lift and difficult to fit. The drivers require a component which will withstand the force of roll over but which will not impose loads which would damage the housing to which the component is bolted.

PRIOR ART

Currently it is known to attach a ROPS of inverted U-shape to the axles on both sides of the differential housing by means of pairs of brackets using clamping bolts and nuts. The clamping operation provides its own clamping sites. U.S. Pat. No. 4,158,460 shows this type of attachment.

U.S. Pat. No. 5,503,430 describes a ROPS wherein the two ends are narrower than the portion of the bar arranged above the drivers seat and the ends are bolted directly to the transmission case between the rear wheels. This type of fitting relies upon the manufacturers provision (Kubota) of twin connection sites for the bar ends.

SUMMARY OF THE INVENTION

The apparatus aspect of the invention provides a ROPS assembly for a tractor comprising a driver protecting part, a coupling for the part, a separable mounting bracket capable of rigid connection to the coupling, the bracket defining multiple fastener apertures for registering with pre-existing attachment sites of a specific model of tractor.

When a person protecting part is a hoop, the hoop may have a lug extending there from which is attachable by screw fasteners to the bracket. The lug may be a flat plate or channel.

The bracket may have a lower portion for attachment to the transmission housing of the tractor and an upper portion for connection to the lug of the hoop. This construction allows a hoop of substantially standard configuration to be sold with a specialised bracket.

The upper portion of the bracket may be a plate or channel with bolt/screw bores to mate with corresponding bores in the lug.

The lower portion may have bores or slots specifically located to utilise existing threaded bores in the differential housing. It is preferable in terms of load resistance if the upper and lower portions are of channel section.

Parts of the upper and lower portions may lie in mutually parallel planes being connected by a bridge member so as to give the bracket a modified Z-shape. The bridge may be a box section component welded to the plates, channels or other configuration.

Preferably the hoop lug is of channel section and the upper portion of the bracket is of channel section, one section lying within the other.

The lower portion may be a modified channel for some models. The portion may comprise a flat plate with a pair of mutually spaced upstanding flanges welded to the plate face. The plate will have bores or slotted holes for the reception of fixing bolts.

The whole component may be made of mild steel.

BRIEF DESCRIPTION OF THE DRAWINGS

One embodiment is now described with reference to the accompanying drawings, in which.

DETAILED DESCRIPTION WITH RESPECT TO THE DRAWINGS

Figure 1:
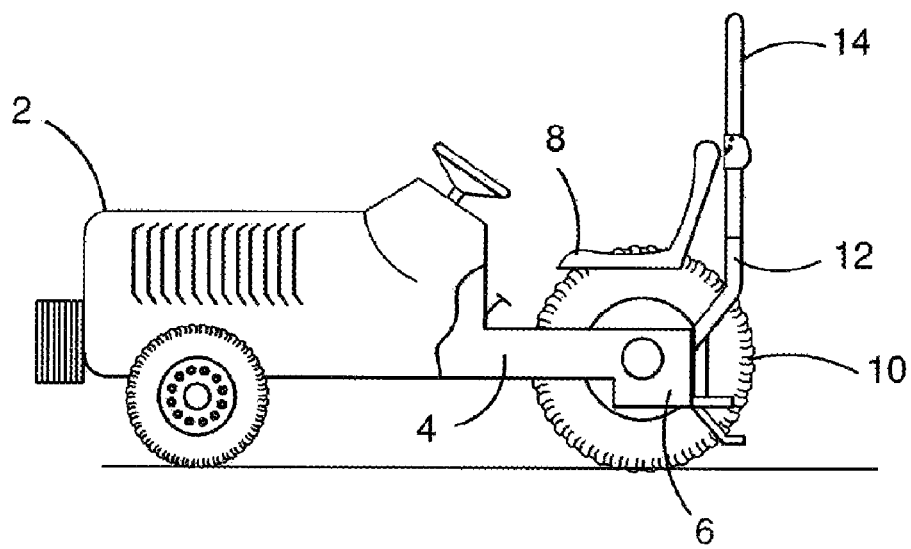
FIG. 1 is a diagrammatic side view of a tractor with one rear wheel removed to show the component in place.
Figure 2:
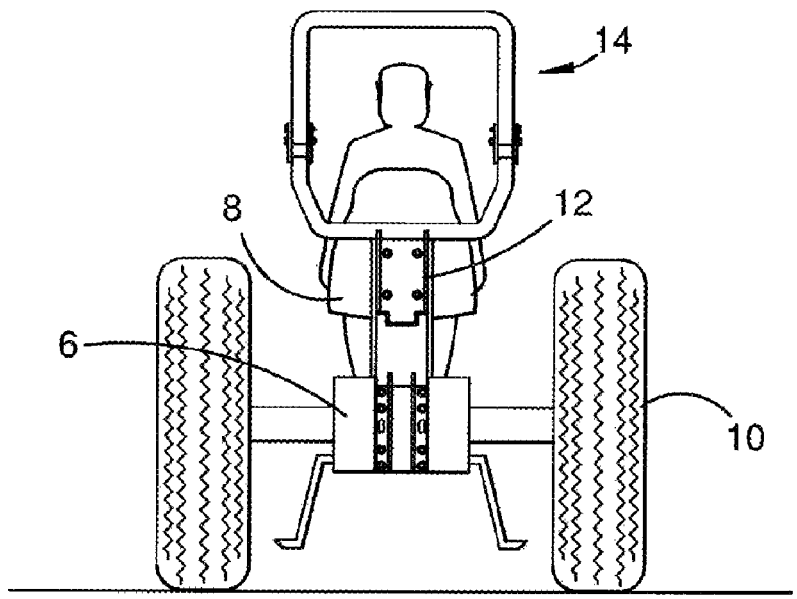
FIG. 2 is a rear view of the tractor in FIG. 1 plus a driver.

A compact KUBOTA™ tractor 2 has a rearward extending transmission section 4 which terminates in a transmission housing 6. Drivers seat 8 is located between the rear wheels 10.

The ROPS consists of a bracket 12 bolted to the end of the differential housing and a separate tubular hoop 14 fixed to the bracket. The hoop is of standard size and shape for all tractors of this mass range, being 895H×760Wmm. The hoop is made of steel tube.

Figure 3:
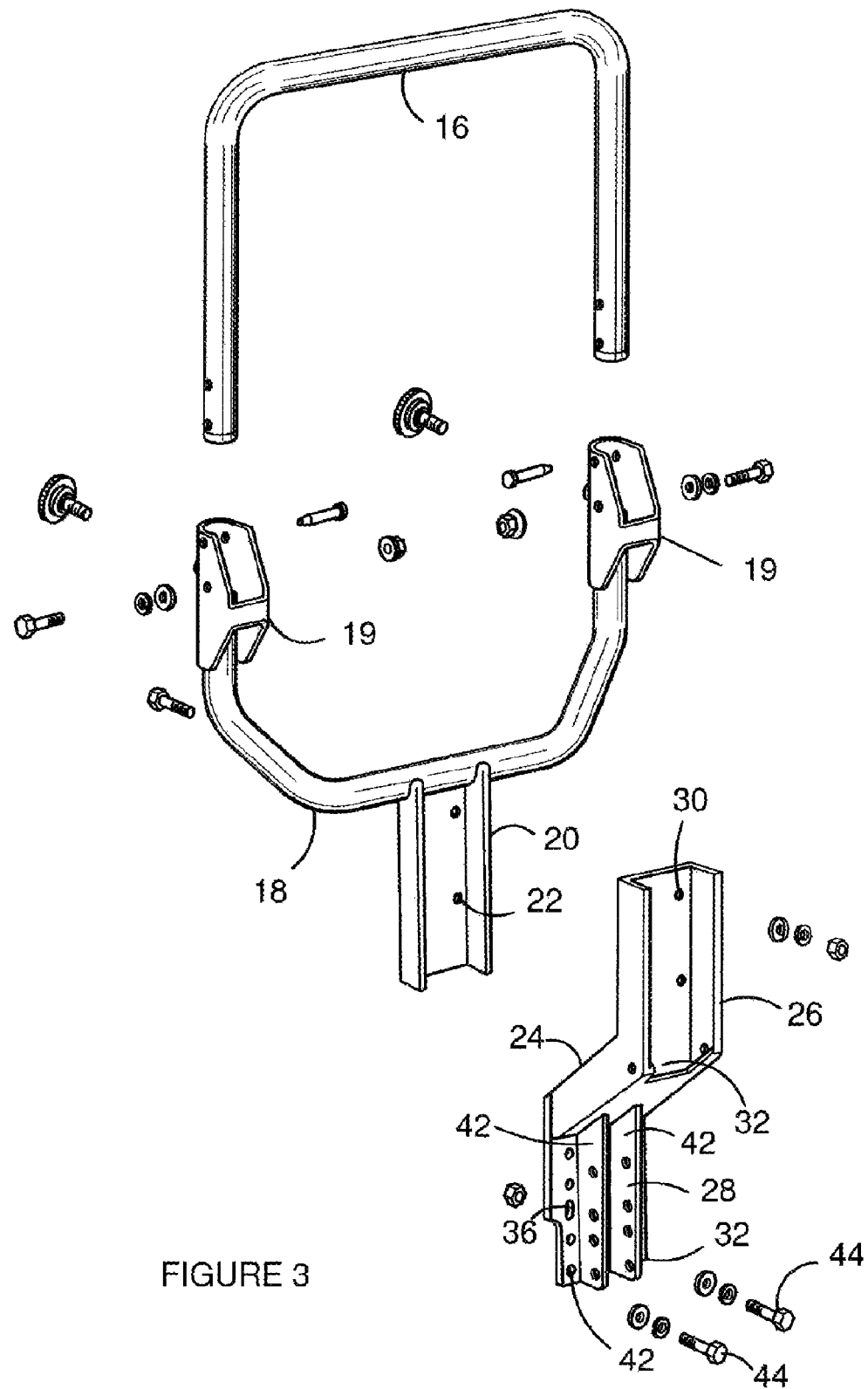
FIG. 3 is a perspective view of the hoop and lug.

Referring now to FIG. 3, the hoop is made of an upper half 16 joined to a lower half 18 by connectors 19 which allow the hoop to fold down for reducing the tractor height. This feature is already known in the prior art. The lower half 18 is welded to a channel section coupling 20 provided with four bolt holes 22 in the transverse hole of the coupling.

The coupling 20 is central and is made from 6 mm mild steel. The spacing of the four bolt holes is the same for all small tractor ROPS according to this invention.

Figure 4:
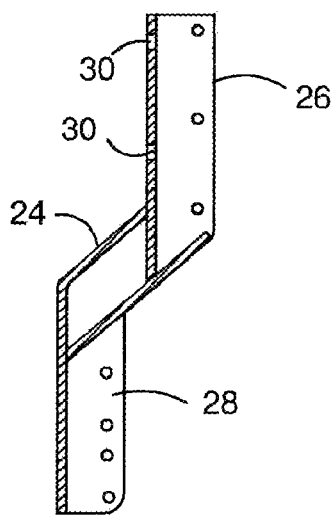
FIG. 4 is a section through the bracket.
Figure 5:
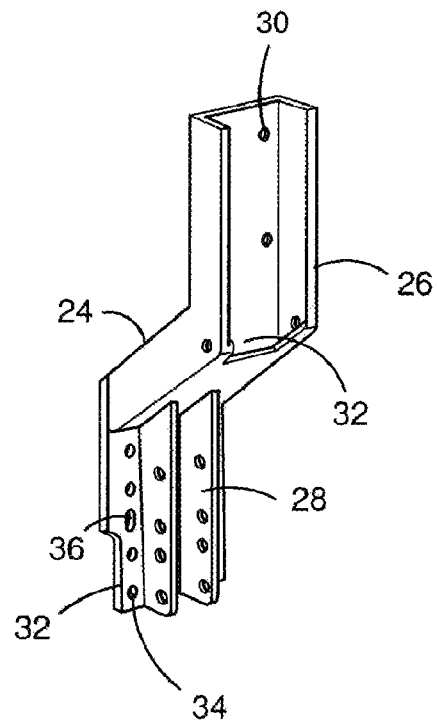
FIG. 5 is a rear perspective view of the bracket of FIG. 4.

Referring now to FIGS. 4 and 5, the bracket 12 is made from laser cut 6 mm mild steel plate. The central box section bridge 24 is inclined to the upper channel 26 and the lower channel 28 which lie mutually parallel. This gives a modified Z-shape evident in FIG. 1 in order to clear the drivers seat.

The width of the upper channel 26 is slightly larger than the coupling channel 20 allowing the two to nest. The upper channel has four bores 30 which register with the bolt holes 20.

The mouth of the bridge is modified to receive the upper channel in that the wall 32 projects into the bridge. The lower channel 32 is the part which is bolted to the transmission housing and it is this part which is designed for specific tractor models. A variety of holes 34 and slots 36 are positioned to register with the threaded bores 38 in the housing 40 of a range of tractor models (see FIG. 8).

Figure 6:
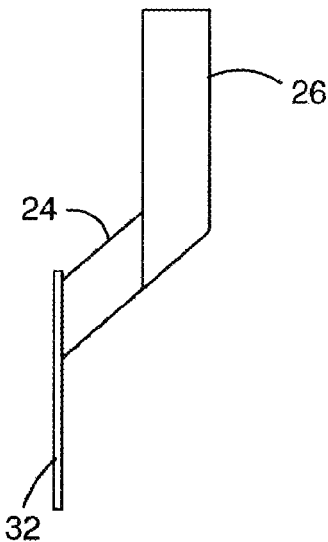
FIG. 6 is a side view of another version of the bracket.
Figure 7:
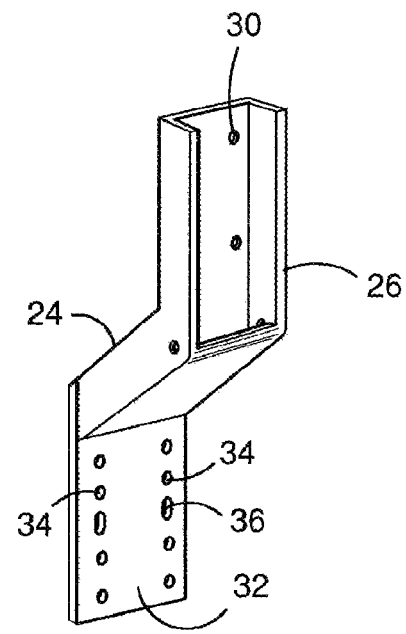
FIG. 7 is a rear perspective view of the bracket of FIG. 6.

In FIGS. 6 and 7, the lower portion of the bracket is a plate 32 has twin rows of six bores 34. The end of the bridge section 24 is welded to the face of the plate.

Figure 8:
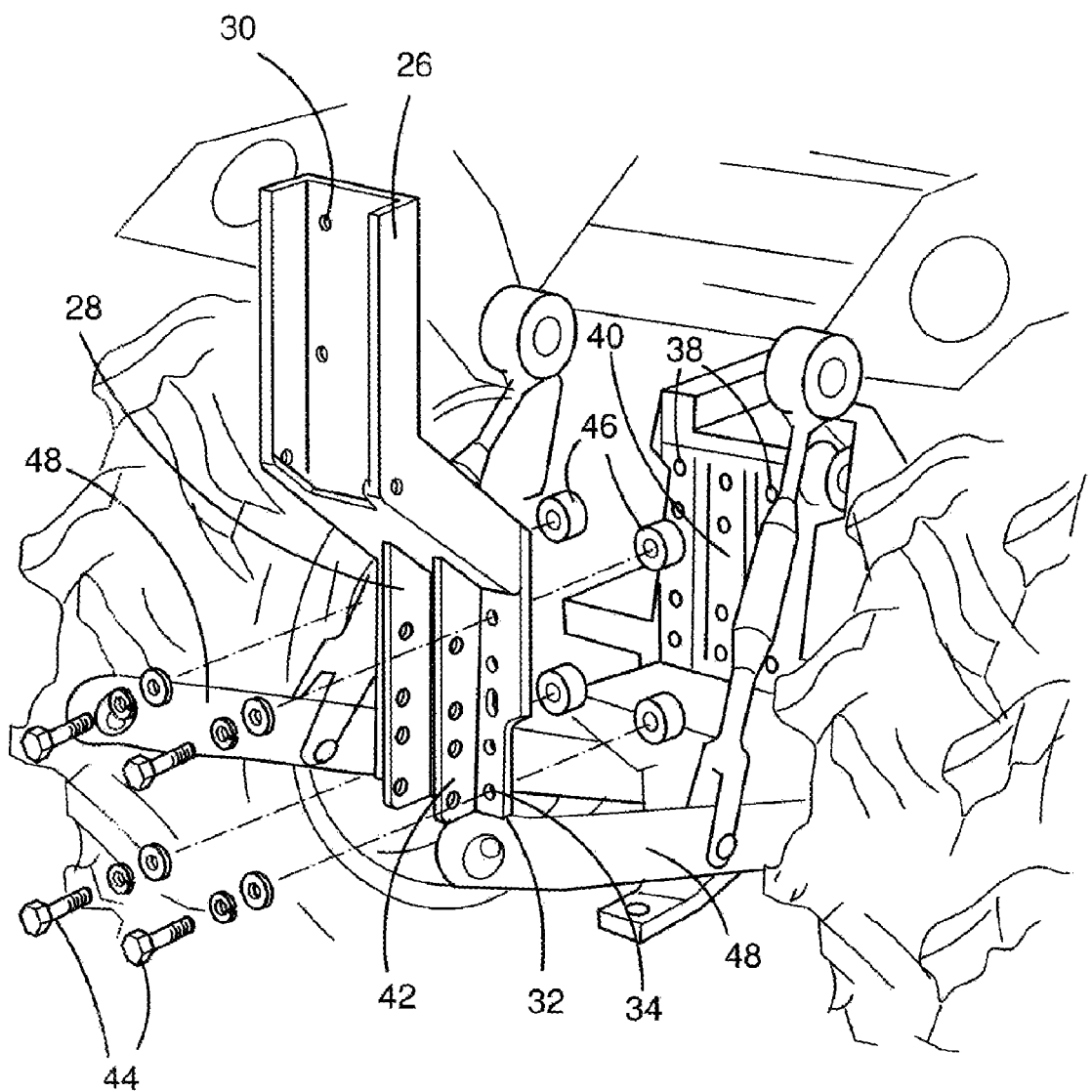
FIG. 8 is a perspective of part of the rear of the tractor showing the bracket fitting procedure.

In FIG. 8, the plate 32 is 8 mm thick and is strengthened by a pair of stiffening strips 42, 6 mm thick, also acting as an integrated top link mounting, which are welded to the rear face of the plate between the rows of bolt holes 34 and slots 36. Bolts 44 pass through plate 32 and screw into threaded bores 38 in the housing. Four spacers 46 fit between the plate 32 and the housing to overcome some obstacles on the mounting face (if required).

The bracket allows full use of the hydraulic lift arms 48 and sets the hoop 14 to the rear of the seat while still giving full roll over protection.

We have found the advantages of the above embodiment to be:

1. The hoops which are made of uniform size are convenient to pack in a stack for freighting.

2. The brackets are made by bending or fabrication sharing some common pieces but the lower channel or plate can be easily modified to any array of bores and slots.

3. The dealer need only stock the selection of brackets for the models popular in his area.

4. The cost is affordable, whereas the cost of a large variety of one piece components would not be.

The invention claimed is:

1. A ROPS assembly for a tractor comprising a driver protecting part, a coupling for the part, and a separable mounting bracket capable of rigid connection to the coupling, the bracket defining multiple fastener apertures for registering with pre-existing attachment sites of a specific model of tractor and having a lower portion for attachment to sites on a transmission housing and an upper portion for connection to the coupling of the driver protecting part.

2. A ROPS assembly as claimed in claim 1, wherein the coupling is a substantially U-section channel which defines at least one pair of fastener apertures.

3. A ROPS assembly as claimed in claim 1, wherein the coupling is a box section tube which defines at least one pair of fastener apertures.

4. A ROPS assembly as claimed in claim 1, wherein the upper portion is a channel component which defines fastener apertures which register with the fastener apertures of the coupling.

5. A ROPS assembly as claimed in claim 1, wherein the lower portion defines fastener apertures specifically located to register with sites in the transmission housing.

6. A ROPS assembly as claimed in claim 1, wherein the upper and lower portions lie in mutually parallel planes and are mutually connected by a bridge member so as to give the bracket a modified Z-shape.

7. A ROPS assembly as claimed in claim 6, wherein the upper bracket portion has a pair of sides joined by a web, the bridge is a square tube with a top wall and a bottom wall and the web of the upper bracket projects into the tube connecting with the top wall and bottom wall of the tube.

8. A ROPS assembly as claimed in claim 1, wherein the coupling is of channel section and the upper portion of the bracket is of channel section, one lying within the other in overlap.

9. A ROPS assembly as claimed in claim 1, wherein the lower portion is a plate stiffened with an obverse face opposite the tractor and a reverse face, the reverse face being stiffened by mutually spaced upstanding flanges fixed to the obverse face.

10. A ROPS assembly as claimed in claim 1, wherein the driver protecting part is a hoop with a circumferentially located coupling.

11. A ROPS assembly according to claim 10, wherein the hoop includes a pair of hinges which connect an upper region of the hoop to a lower region of the hoop so that the upper region may be folded with respect to the lower region.

12. Mounting bracket for a ROPS which has a person protecting part and coupling, the bracket comprising a body with a part supporting end and an attachment end, the part supporting end being standardised to match the coupling, the attachment end being adapted by its dimensions and shape to abut a transmission housing of a tractor and defining multiple fastener apertures.

* * * * *

UNITED STATES PATENT AND TRADEMARK OFFICE
CERTIFICATE OF CORRECTION

| | | |
|---|---|---|
| PATENT NO. | : 7,438,319 B2 | Page 1 of 1 |
| APPLICATION NO. | : 11/672595 | |
| DATED | : October 21, 2008 | |
| INVENTOR(S) | : Bruce Russell Lee Cooper and Frank Allen Ford | |

It is certified that error appears in the above-identified patent and that said Letters Patent is hereby corrected as shown below:

Title Page, item (76) Inventors: should be deleted and replaced with:

(76)    Bruce Russell Lee Cooper, 23 Wright Street, Clifton Hills, 3068,

Victoria (AU); Frank Allen Ford, 3 Bowen Street, Hawthorn, 3122,

Victoria (AU)

Signed and Sealed this

Thirtieth Day of December, 2008

JON W. DUDAS
*Director of the United States Patent and Trademark Office*